June 9, 1936.    T. A. HENLEY    2,043,619

PLOW

Filed June 13, 1935    2 Sheets-Sheet 1

T. A. Henley

Inventor.

By C. A. Snow & Co.

Attorneys.

June 9, 1936. T. A. HENLEY 2,043,619
PLOW
Filed June 13, 1935 2 Sheets-Sheet 2
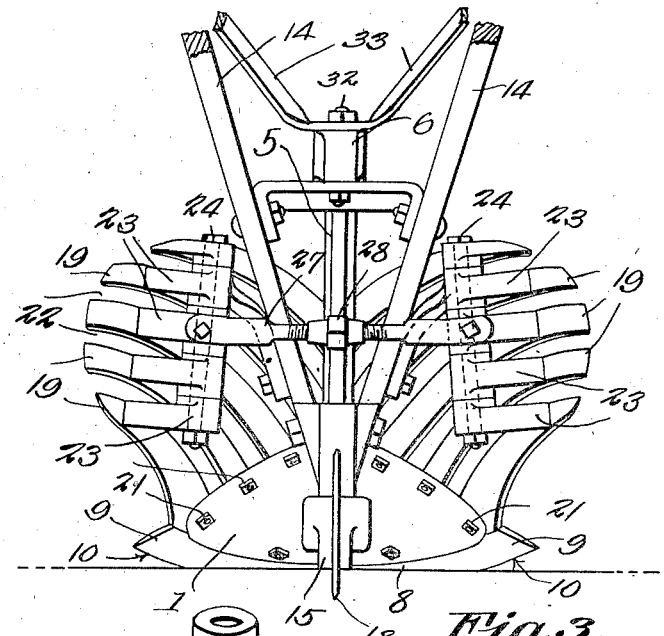
Fig. 3.
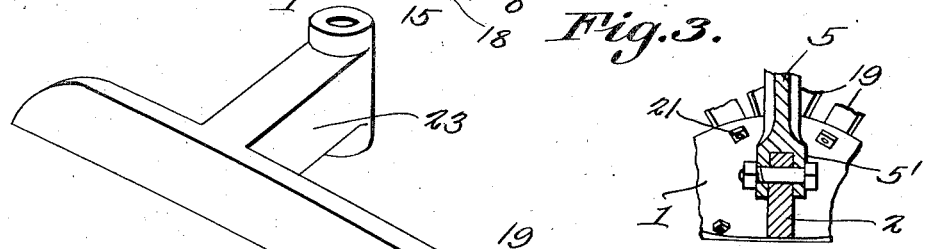
Fig. 5.
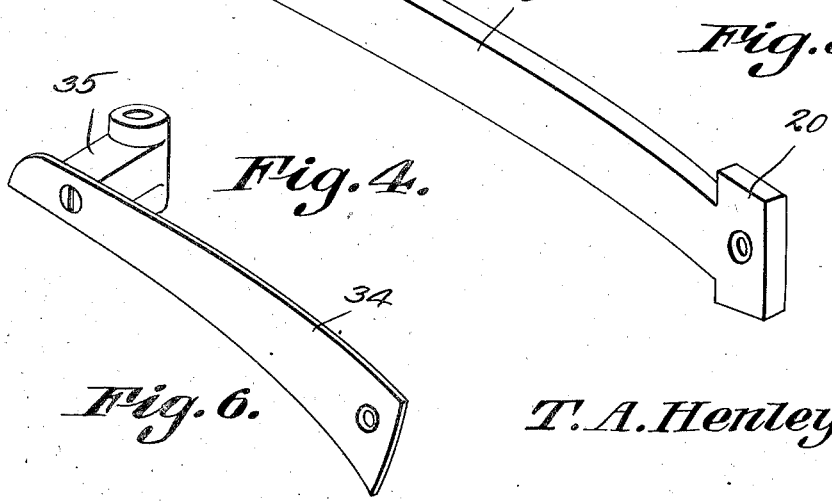
Fig. 4.
Fig. 6.
T. A. Henley
Inventor.
By C. A. Snow & Co.
Attorneys.

Patented June 9, 1936

2,043,619

UNITED STATES PATENT OFFICE 2,043,619

PLOW

Tom A. Henley, Vilonia, Ark.

Application June 13, 1935, Serial No. 26,456

5 Claims. (Cl. 97—123)

This invention relates to plows, one of the objects being to so construct the plow as to offer minimum resistance to the movement of the soil therealong and correspondingly reduce the load upon the draft animals.

A further object is to provide a plow having wings of novel construction through which portions of the loosened soil can sift so that the amount of soil deflected laterally is reduced and a lighter pull is thereby made possible.

Another object is to provide a plow made up of parts assembled in a new and novel manner whereby the resultant implement is both light and durable.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 3 is a rear elevation.

Figure 4 is a perspective view of one of the wing fingers of the plow.

Figure 5 is a section on line 5—5, Figure 2.

Figure 6 is a perspective view of a modified form of wing finger.

Figure 1:
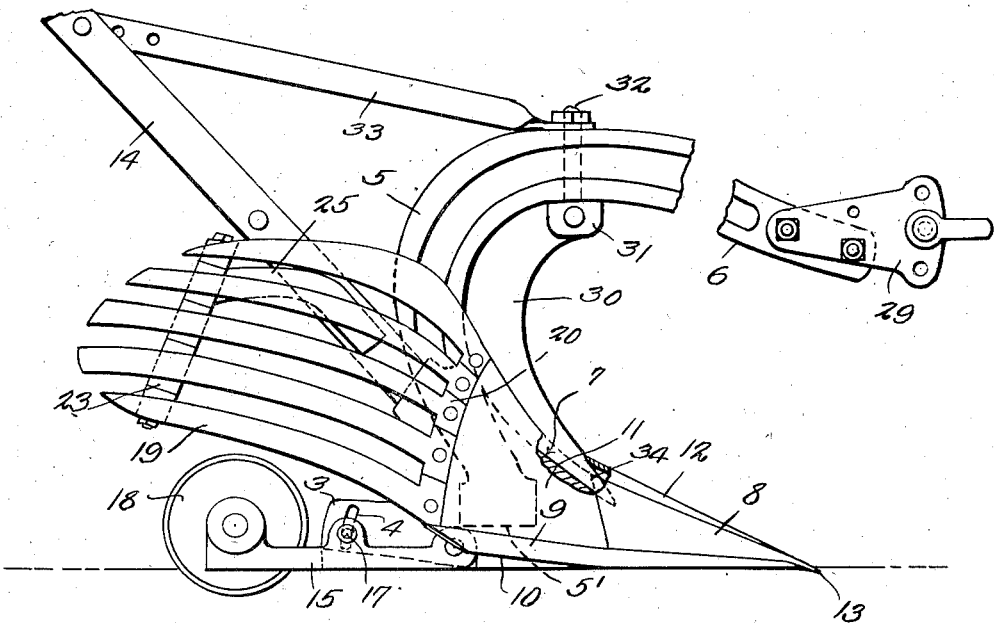
Figure 1 is a side elevation of the plow.
Figure 2:
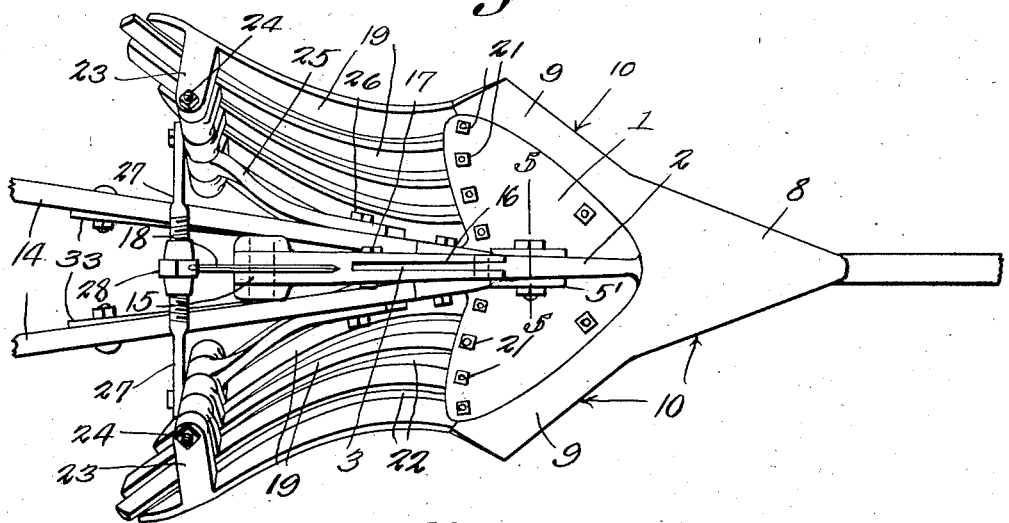
Figure 2 is a bottom plan view.

Referring to the figures by characters of reference 1 designates the frog of a plow from the bottom of which is extended a rib 2 having a rearward extension 3 constituting a fixed runner or slide section. This section has an arcuate slot 4 as shown.

A standard 5 has a forked lower end 5' straddling and secured to the rib 2 and this standard merges along curved lines into a beam 6 having a clevis 29 adjustably connected to its front end.

Located in front of the standard 5 so as to bear backwardly thereagainst is an arcuate cutting blade 30 the upper end of which is seated in a bracket 31 attached to the bottom of beam 6 by a bolt 32 extending upwardly therethrough, and used also for fastening rearwardly diverging braces 33 to the beam.

The lower end of the cutting blade 30 is pointed as at 34 and is adapted to be seated detachably in a slot 7 formed in the center of the frog 1 at the front thereof.

The point 8 of the plow is bolted or otherwise secured upon the front portion of the frog and has rearwardly diverging wings 9 also secured to the frog. The advancing edges of the point and wings are sharpened as shown at 10 so that they can cut through the soil readily.

Moldboards 11 in the form of properly shaped plates are fitted between the sides of standard 5 and in the angles formed by point 8 and its wings 9, these moldboards being suitably secured upon the frog so as to cooperate with the point and wings to provide smooth deflecting surfaces for the loosened soil. Point 8 has its top surface inclined and is provided with a central cutting ridge 12 which extends from the forward extremity 13 of the point upwardly and rearwardly to form in effect a continuation of the cutting edge of the blade 30.

Upwardly and rearwardly diverging handles 14 are secured to the standard 5 back of frog 1 and are also engaged by braces 33.

The movable member of the runner or slide has been indicated at 15 and comprises an elongated strip the forward end of which is forked as shown at 16 so as to straddle and extend longitudinally of the member 3. A clamp 17 extends transversely through the movable member 15 and slot 4. A disk colter 18 is mounted for rotation in the forked back end of the member 15 and projects below the bottom edge of said member.

Obviously member 15 can be adjusted angularly relative to member 3 so as to cause the slide or runner to hold the plow at any desired pitch, it being understood that the colter 18 will cut into the soil as the plow advances and will act to keep the plow pointed in the proper direction.

The wing of each moldboard 11 is made up of separate fingers 19 the forward ends of which are enlarged as at 20 and contact at their sides. These enlarged ends abut against the adjacent moldboard and are bolted on to the back portion of the frog as shown at 21. The fingers are spaced apart to provide slots 22 which are open at their back ends and the group of fingers associated with each moldboard 11 is so shaped as to constitute a slotted continuation of the moldboard having the functions of the usual moldboard wing.

The improved wing has an advantage over other wings in that the slots reduce the deflecting area of the wing, permitting some of the loosened soil to sift therethrough and correspondingly reducing the resistance to the forward draft.

Extending inwardly from the rear end portion of each finger is a lug 23 and the lugs of all of the fingers of each group are joined by a tie bolt 24 extending downwardly through them. Mounted between two of the lugs of each group is one end of a brace 25 which is held assembled with the lugs by the tie bolt. The braces 25 of the two groups converge forwardly and are fastened to the handles 14 as shown at 26.

The wings made up of the fingers 19 are further braced by rods 27. One of these rods is secured to one lug 23 of each group. The rods are extended toward each other and are securely joined adjustably by a turnbuckle 28.

Obviously should one or more of the fingers 19 become worn or broken it could be removed readily and another substituted.

A plow embodying the present improvements can be used for any purpose and while the reduction of the load renders the plow especially useful where draft animals are employed it is to be understood that it will also be found advantageous for use in connection with tractors.

Instead of casting each lug 23 as an integral part of its finger, the said finger can be made of heavy sheet steel as shown at 34 in Figure 6 with a lug 35 fastened to it.

What is claimed is:

1. In a plow the combination with a frog, a point attached thereto and share plates secured on the frog and extending to the point, of separate fingers detachably secured to the frog and curved backwardly and laterally from each of the share plates, said fingers being arranged in groups, lugs on the backs of the fingers cooperating to hold the fingers of each group spaced apart to form a slotted wing, and connecting means extending through the lugs of each group to hold them together against relative movement.

2. In a plow the combination with a frog, a point attached thereto and share plates secured on the frog and extending to the point, of separate fingers detachably secured to the frog and curved backwardly and laterally from each of the share plates, said fingers being arranged in groups, lugs on the back of the fingers cooperating to hold the fingers of each group spaced apart to form a slotted wing, connecting means engaging the lugs of each group to hold them together against relative movement, and an adjustable brace joining the lug connecting means of the two groups of fingers.

3. In a plow the combination with a frog, a point attached thereto and share plates secured on the frog and extending to the point, of separate fingers detachably secured to the frog and arranged in groups extending backwardly from each of the share plates, said fingers being arranged in groups, the fingers of each group being spaced apart to form a slotted wing, lugs extending from the rear end portions of the fingers of each group toward the fingers of the opposed group, a tie element extending through the lugs of each group, and a bracing means connected to the lugs of the two groups.

4. In a plow the combination with a frog, a point attached thereto and share plates secured on the frog and extending to the point, of separate fingers detachably secured to the frog and arranged in groups extending backwardly from each of the share plates, said fingers being arranged in groups, the fingers of each group being spaced apart to form a slotted wing, handles extending from the frog, lugs upon the rear portions of the fingers of each group, means spaced inwardly from the fingers of each group for detachably joining the lugs of that group, and braces connecting said means to the handles.

5. A plow including a frog, a standard extending back of the frog, a cutting element thereon above the frog, a point having forwardly converging cutting edges and an upwardly and rearwardly inclined cutting ridge extending from the point to the cutting element on the standard, rearwardly diverging wings carried by the point and having forwardly converging cutting edges, plates fitted against the point, wings and standard and secured to the frog to constitute shares, and separate fingers detachably secured to the frog and extending rearwardly and laterally from the plate to constitute wings, said fingers being spaced apart to provide slots open at their rear ends, and means between the wings and spaced from the fingers for detachably joining said fingers to hold them against relative movement.

TOM A. HENLEY.